(12) United States Patent
Seitz et al.

(10) Patent No.: US 11,581,545 B2
(45) Date of Patent: Feb. 14, 2023

(54) MINIATURE ELECTROCHEMICAL CELL HAVING A CASING COMPRISING OPPOSED CERAMIC SUBSTRATES HOUSING AN ELECTRODE ASSEMBLY ACTIVATED WITH A SOLID ELECTROLYTE

(71) Applicant: Greatbartch Ltd., Clarence, NY (US)

(72) Inventors: Keith W. Seitz, Clarence Center, NY (US); Brian P. Hohl, Clarence, NY (US); Todd C. Sutay, Warsaw, NY (US); Gary Freitag, East Aurora, NY (US)

(73) Assignee: Greatbatch Ltd., Clarence, NY (US)

( * ) Notice: Subject to any disclaimer, the term of this patent is extended or adjusted under 35 U.S.C. 154(b) by 350 days.

(21) Appl. No.: 17/010,985

(22) Filed: Sep. 3, 2020

(65) Prior Publication Data

US 2020/0403245 A1 Dec. 24, 2020

Related U.S. Application Data

(63) Continuation-in-part of application No. 16/003,868, filed on Jun. 8, 2018, now Pat. No. 10,770,698.

(60) Provisional application No. 62/517,408, filed on Jun. 9, 2017.

(51) Int. Cl.
| | |
|---|---|
| *H01M 4/66* | (2006.01) |
| *H01M 4/36* | (2006.01) |
| *H01M 4/04* | (2006.01) |
| *H01M 10/0525* | (2010.01) |
| *H01M 4/134* | (2010.01) |
| *H01M 4/131* | (2010.01) |
| *H01M 50/46* | (2021.01) |

(52) U.S. Cl.
CPC ......... *H01M 4/664* (2013.01); *H01M 4/0471* (2013.01); *H01M 4/131* (2013.01); *H01M 4/134* (2013.01); *H01M 4/364* (2013.01); *H01M 4/661* (2013.01); *H01M 10/0525* (2013.01); *H01M 50/46* (2021.01)

(58) Field of Classification Search
CPC .... H01M 4/664; H01M 4/0471; H01M 4/131; H01M 4/134; H01M 4/364; H01M 4/661; H01M 10/0525; H01M 50/46; H01M 4/382; H01M 4/525; H01M 10/052; H01M 6/18; H01M 10/30; H01M 10/345; H01M 50/14; H01M 50/145; H01M 50/117; H01M 2300/0068; H01G 11/56; H01G 11/06; H01G 11/50; H01G 11/78; Y02E 60/10
USPC ....................................................... 429/185
See application file for complete search history.

(56) References Cited

U.S. PATENT DOCUMENTS

2018/0108496 A1* 4/2018 Venkateswaran ..... B23K 11/115

\* cited by examiner

*Primary Examiner* — Gary D Harris
(74) *Attorney, Agent, or Firm* — Michael F. Scalise (57) ABSTRACT

A miniature electrochemical cell having a volume of less than 0.5 cc is described. The cell has a casing of first and second ceramic substrates that are hermetically secured to each other to provide an internal space housing an electrode assembly. First and second conductive pathways extend through the ceramic substrates. The pathways have respective inner surfaces that are conductively connected to the respective anode and cathode current collectors and respective outer surfaces that provide for connection to a load. An electrolyte in the internal space of the housing activates the electrode assembly.

20 Claims, 2 Drawing Sheets

MINIATURE ELECTROCHEMICAL CELL HAVING A CASING COMPRISING OPPOSED CERAMIC SUBSTRATES HOUSING AN ELECTRODE ASSEMBLY ACTIVATED WITH A SOLID ELECTROLYTE

CROSS-REFERENCE TO RELATED APPLICATIONS

This application claims priority to U.S. patent application Ser. No. 16/003,868, filed on Jun. 8, 2018, now U.S. Pat. No. 10,770,698, which claims priority to U.S. provisional patent application Ser. No. 62/517,408, filed on Jun. 9, 2017.

BACKGROUND OF THE INVENTION

1. Field of the Invention

The present invention relates to the art of electrochemical cells. More particularly, the present invention relates to an improved miniature electrochemical cell, which is defined as a cell having a total volume that is less than 0.5 cc.

2. Prior Art

Conventional miniature electrochemical cells are primarily designed as coin cells, which is a convenient configuration for the assembly of small cells. A typical coin cell has a metal base and a metal lid that serve as the opposite polarity terminals for the cell and are electrically isolated from each other by a plastic gasket. A seal is formed by crimping the metal base around the gasket. The plastic gasket then electrically isolates the base and lid from each other. However, seals formed by crimping a metallic member onto a plastic gasket are difficult to form consistently and are known to be unacceptably porous for hermetic applications. A compromised hermetic seal may present an escape path for electrolyte or allow for atmospheric contaminants to get inside the cell and disrupt its operation. Ingress of water is particularly problematic for lithium electrochemical cells. In that respect, crimped plastic seals may not provide the type of consistent longevity from one cell to the next that is required for some applications, particularly when the cell is intended to power a device implanted in a human or animal body.

In addition, the crimped metal/plastic seal has a certain peripheral volume requirement that reduces space for the electrodes, thereby reducing cell capacity and energy density. A conventional coin cell with a crimped seal may not have sufficient energy per unit volume to power the associated electronic device for an acceptable period of time. Further, there is a limit to how small a crimped seal can be made; below a certain size, it may not be possible to construct the coin cell at all.

U.S. Pat. No. 8,697,278 to Wyser et al. describes a coin cell construction having a metal lid and a metal base. The lid is anodized to form an insulation layer on selected portions thereof. This insulating material is then coated with a formable material, such as gold, and the lid is press-fitted to the metal base so that the anodized layer acts as an insulator between the opposite polarity base and lid while the formable material seals the anodized layer to the base. In this prior art cell construction, however, the sealing strength between the formable layer and the metal base may not be strong enough to withstand the pressure of evolved gas or electrode expansion. This may cause the base and lid to gradually separate from each other, resulting in leakage of electrolyte from the cell and loss of function.

Therefore, what is needed is an improved miniature electrochemical cell having a total volume that is less than 0.5 cc. The cell enclosure must be both mechanically robust and resistive to corrosion of the type that can occur when the cell is implanted in an animal or human body. The miniature electrochemical cells of the present invention meet these needs.

SUMMARY OF THE INVENTION

Miniature electrochemical cells according to the present invention employ mechanically robust sealing approaches that are capable of maintaining hermeticity for 10 years, or more. A ceramic material serves as the insulating layer disposed between the anode and cathode terminals. The insulating ceramic is joined to the opposite polarity terminals using a metal-containing feedthrough formed by co-firing a metallic paste in a via hole extending through a green ceramic.

In that respect, as with every cell, miniature electrochemical cells according to the present invention have two terminals that are electrically isolated from each other. However, in order for the cell to operate for 10 years or more, novel robust sealing methodologies are required to prevent ingress of moisture or egress of electrolyte while still providing adequate electrical isolation between the terminals. The problem is that conventional sealing methods are often not practical when cell sizes drop below 0.5 cc. That is because the seals themselves become a major portion of the overall cell volume. On the other hand, the present invention describes multiple encapsulation methodologies that are designed to provide a miniature electrochemical cell having a total volume of less than 0.5 cc with a hermetic seal exhibiting high volumetric efficiency.

In addition, as cells become smaller and smaller, it becomes more difficult to find space for the electrolyte fill port, and to find a practical means of plugging and sealing the fill port. The present invention describes a novel fill port design and hermetic fill port sealing process that is readily adapted to miniature electrochemical cells having a total volume of less than 0.5 cc.

Moreover, with cell sizes below 0.5 cc, it may become advantageous to use a solid electrolyte so that filling with a liquid is not required. However, conventional solid electrolyte cells are known to undergo expansion and contraction during cycling and consequently require hermetic encapsulation structures that are designed to accommodate the expected dimensional changes. Enclosure designs for miniature cells activated with solid electrolyte systems do not currently exist. Therefore, one aspect of the present invention is to provide encapsulation structures that can be applied to miniature solid-state electrochemical cells to provide a hermetic seal while accommodating the required dimensional changes.

In the case of solid-state cells, ceramic substrates are well known in the art, but are often formed with rough surfaces. Rough substrate surfaces can lead to defective coatings such as interrupted interconnection traces, protrusions which may cause electric shorting between layers, uneven reaction leading to poor cycling or dendrite formation, and the like. Miniature solid-state electrochemical cells according to the present invention use physical vapor deposition (PVD) for laying down the non-active layers, for example the anode and cathode current collectors, onto ceramic substrates that have been lapped and polished with slurry or ceramic coated grinding paper followed by diamond polishing to a smooth surface finish.

Another problem with conventional miniature electrochemical cell designs is the need for the materials from which the cell is constructed to be both chemically compatible with each other and not susceptible to undesirable corrosion reactions. In the case of a ceramic housing, a miniature electrochemical cell according to the present invention uses various electrically conductive materials in the form of a conductive paste that is filled into a via hole extending through a ceramic plate-shaped substrate to thereby provide a hermetic feedthrough. A current collector is then deposited on an inner surface of the lapped and polished ceramic substrate in contact with the via fill material. In addition to providing electrical conduction from the electrode active layer to the via fill material, the current collector protects the fill material from corrosive reactions with other battery components while exhibiting good adhesion to the ceramic substrate or to an adhesion layer on the substrate should there be one. Exemplary current collectors according to the present invention are from about 0.1 microns to about 50 microns thick and comprised of a metallic layer that is deposited on the ceramic substrate using a PVD process so that the deposited metal covers the via. Exemplary current collector materials include copper and titanium.

Thus, the present invention describes various concepts for miniature electrochemical cells. The first cell concept relates to a hermetically-sealed electrochemical cell activated with either a liquid or a solid electrolyte. One or both of the anode and cathode terminals consist of a metal or metal/ceramic mixture surrounded by a ceramic substrate with the metal or metal/ceramic mixture being hermetically bonded or sealed to the substrate. The bond is preferably formed by co-firing a metallic material filled into a via hole extending through a green ceramic body. The metal is preferably platinum, or a platinum/ceramic composite and the ceramic is 3% YSZ or alumina.

A miniature electrochemical cell activated with a liquid electrolyte comprises a ceramic enclosure containing a secondary via serving as a fill port. A metallic material is filled into the secondary via with an open hole in the center of the fill material. After the cell is filled with electrolyte, the metallic material in the electrolyte fill via is melted, preferably using a laser, to form a hermetic seal. The metal is preferentially platinum, or platinum ceramic composite and the ceramic is 3% YSZ or alumina.

A hermetically-sealed electrochemical cell comprises a ceramic lid and a ceramic base. The lid and base are joined by welding a peripheral band that is attached to the ceramic by co-firing the band with the ceramic so that they are chemically-bonded together. Preferably, the metal periphery band consists of platinum co-fired with a ceramic or a composite of platinum/ceramic co-fired with additional filler metals selected from gold, platinum, and palladium at the weld joint.

In the case of a miniature electrochemical cell according to the present invention that is activated with a solid electrolyte, the hermetic ceramic enclosure is provided with a welded periphery and metallic feedthroughs in which the bottom surface of the lid is between 1 and 100 µm above the upper surface of the cell stack. The gap between the cell stack and the lid provides sufficient space for dimensional changes to the cell stack without damaging the enclosure or disrupting the seal.

DETAILED DESCRIPTION OF THE PREFERRED EMBODIMENTS

A miniature electrochemical cell according to the present invention is not limited to any particular type. The miniature electrochemical cell can be an alkaline cell, a primary lithium cell, a rechargeable lithium cell, a Ni/cadmium cell, a Ni/metal hydride cell, a supercapacitor, a thin film solid-state cell, and the like. An exemplary miniature electrochemical cell is of a lithium-ion chemistry having a carbon-based anode and a metal oxide-based cathode, such as a cathode of $LiCoO_2$ or $LiNi_aMn_bCo_{1-a-b}O_2$, or a solid-state thin film cell with a lithium anode, a metal-oxide based cathode and a solid electrolyte, for example a LiPON ($Li_xPO_yN_z$, with x ranging from 3 to 4, y ranging from 3 to 4 and z ranging from 0.1 to 1) electrolyte. If the cell is not of a solid-state chemistry, it is activated with a liquid electrolyte. The liquid electrolyte is added to the cell stack prior to joining the case and lid, or alternatively, a fill port is provided in the metallic or ceramic casing so that the fill port and consequentially the casing can be hermetically sealed after filling with electrolyte.

Figure 1:
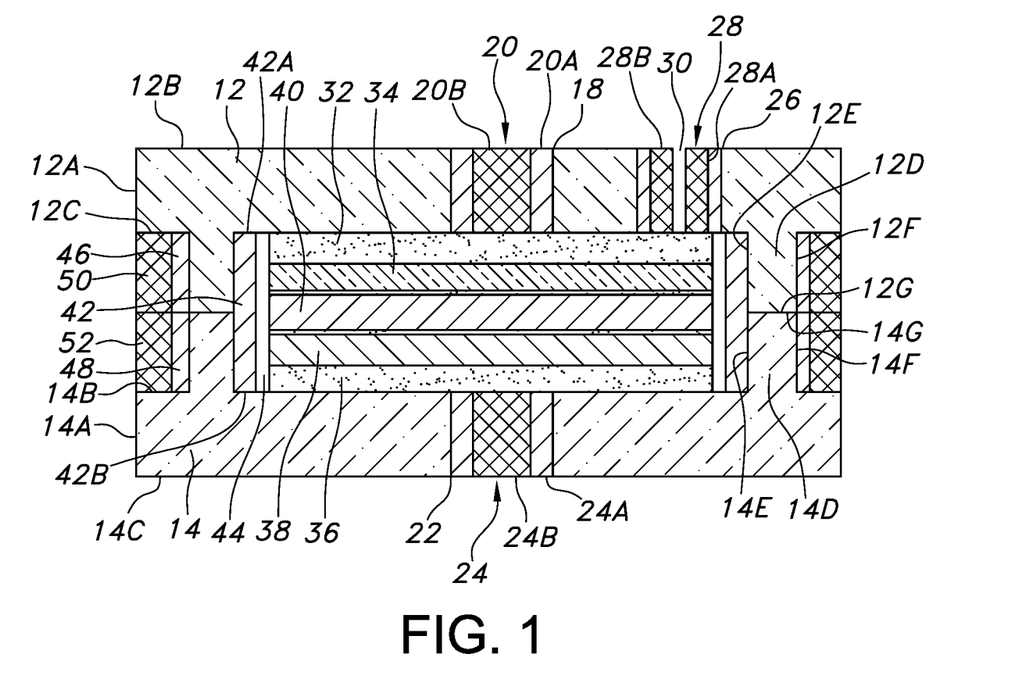
FIG. 1 is a cross-sectional view of one embodiment of a miniature electrochemical cell 10 according to the present invention.

Referring now to the drawings, FIG. 1 illustrates a first embodiment of a miniature electrochemical cell 10 according to the present invention. The cell 10 comprises a first monolithic substrate or plate 12 of a ceramic material, for example, of alumina that is spaced from a second monolithic substrate or plate 14 of a ceramic material, for example, of alumina. According to one embodiment of the present invention, the first and second substrates 12, 14 may be fabricated from a pressed ceramic slurry in tape form, which is widely available commercially. Also, according to the present invention, a substrate of 92%-99% alumina ($Al_2O_3$) may be used for the ceramic substrates 12, 14. The substrate material may be bought in sheet form, which may be flexible or rigid.

The first ceramic substrate 12 has a major sidewall 12A extending to an upper surface 12B and a lower surface 12C. The upper and lower surfaces 12B, 12C are substantially co-planar. The major sidewall 12A is not limited to any particular shape; it can have a curved annular shape or comprise front and back sidewall portions meeting right and left sidewall portions. As those skilled in the art will readily understand, a myriad of other shapes is contemplated for the major sidewall 12A of the first ceramic substrate 12, the shape being limited only by the form factor for the particular application or device that the cell 10 is intended to power.

A depending annular portion 12D extends downwardly from the lower surface 12C of the ceramic substrate 12. The annular portion 12D comprises an inner annular surface 12E spaced from an outer annular surface 12F. Both annular surfaces 12E and 12F meet an annular face 12G. As shown, the annular portion 12D is spaced inwardly from the major sidewall 12A.

The first ceramic substrate 12 has a first via hole 18 extending from the upper surface 12B to the lower surface 12C thereof. The first via hole 18 is provided with an electrically conductive pathway 20 that extends to the spaced apart upper and lower ceramic substrate surfaces 12B, 12C. The electrically conductive pathway 20 is formed by filling the via hole 18 with a ceramic reinforced metal composite or CRMC paste 20A and then, in the green state, the inner diameter of the CRMC paste is drilled out so that the via hole can be re-filled with a substantially pure platinum paste, or a platinum wire 20B. In the case of a substantially pure platinum paste 20B, the paste formulation is substantially devoid of a ceramic material.

The second ceramic substrate 14 has a major sidewall 14A extending to an upper surface 14B that is substantially coplanar with a lower surface 14C. In a similar manner as with the major sidewall 12A of the first ceramic substrate 12, the shape of the major sidewall 14A is not limited to any particular form as it may have a myriad of shapes dictated by the form factor for the particular application or device that the cell 10 is intended to power. Preferably, however, the major sidewalls 12A, 14A of the respective first and second ceramic substrates 12, 14 have similar peripheral shapes.

An annular portion 14D extends upwardly from the upper surface 14B of the ceramic substrate 14. The upstanding annular portion 14D comprises an inner annular surface 14E spaced from an outer annular surface 14F. Both annular surfaces 14E and 14F meet an annular face 14G. As shown, the annular portion 14D is spaced inwardly from the major sidewall 14A.

The second substrate 14 preferably comprises a monolithic alumina substrate that has a second via hole 22 extending from the upper surface 14B to the lower surface 14C thereof. The second via hole 22 is provided with a conductive pathway 24 that extends to the spaced apart upper and lower substrate surfaces 14B, 14C. Conductive pathway 24 is similar to the conductive pathway 20 disposed through the first via hole 18 of the first ceramic substrate 12 and is comprised of a CRMC paste 24A surrounding a cylinder of substantially pure platinum paste 24B. The CRMC paste 24A is similar to the CRMC paste 20A and the platinum cylinder 24B is similar to the substantially pure platinum cylinder 20B of the first conductive pathway 20.

The first ceramic substrate 12 also has a third via hole 26 extending to the upper and lower surfaces 12B, 12C. However, instead of filling or occupying the entire volume of the third via hole in a similar manner as the first and second conductive pathways 20, 24 occupy the first and second via holes 18, 22 in the respective first and second ceramic substrates 12, 14, the third platinum fill 28 has the shape of a sleeve provided with an opening 30 extending to the upper and lower surfaces 12B, 12C. In that respect, the third via hole 26 is provided with an outer cylinder of CRMC paste 28A surrounding an inner cylinder of substantially pure platinum paste 28B. As will be described in detail hereinafter, opening 30 serves as a passageway for filling an electrolyte into the interior of the electrochemical cell 10.

Examples of CRMC ceramic/metal pairings include, but are not limited to:

a) Alumina ($Al_2O_3$) or zirconia ($ZrO_2$) including various stabilized or partially stabilized zirconia like zirconia toughened alumina (ZTA) and alumina toughened zirconia (ATZ) with platinum (Pt) or palladium (Pd).

b. Alumina ($Al_2O_3$) or zirconia ($ZrO_2$) with iridium, rhenium, rhodium, various Pt alloys (e.g., Pt—Ir, Pt—Pd, Pt—Rh, Pt—Re, Pt—Au, Pt—Ag etc.), Pd alloys (e.g., Pd—Ir, Pd—Re, Pd—Rh, Pd—Ag, Pd—Au, Pd—Pt, Pd—Nb, etc.), Au alloys (e.g., Au—Nb, Au—Ti, etc.), Au alloys (e.g., Au—Nb, Au—Ti, etc.), and Ti alloys (e.g., Ti—Al—V, Ti—Pt, Ti—Nb, etc.)

Other non-limiting biocompatible metals and alloys that may be used in place of platinum include niobium, platinum/palladium, stainless steels, and titanium.

Furthermore any of the following materials may be used alone or in combination with any of the materials already discussed or within this list: gold (Au), silver (Ag), iridium (Ir), rhenium (Re), rhodium (Rh), titanium (Ti), tantalum (Ta), tungsten (W), zirconium (Zr), and vanadium (V); cobalt chromium molybdenum alloy, cobalt chromium nickel iron molybdenum manganese alloy, cobalt chromium tungsten nickel iron manganese alloy, cobalt nickel chromium iron molybdenum titanium alloy, cobalt nickel chromium iron molybdenum tungsten titanium alloy, cobalt nickel chromium molybdenum alloy, copper aluminum nickel alloy, copper zinc alloy, copper zinc aluminum nickel alloy, copper zinc silver alloy, gold platinum palladium silver indium alloy, iron chromium alloy, iron chromium nickel alloy, iron chromium nickel aluminum alloy, iron chromium nickel copper alloy, iron chromium nickel copper molybdenum niobium alloy, iron chromium nickel copper niobium alloy, iron chromium nickel copper titanium niobium alloy, iron chromium nickel manganese molybdenum alloy, iron chromium nickel molybdenum alloy, iron chromium nickel molybdenum aluminum alloy, iron chromium nickel titanium molybdenum alloy, iron manganese chromium molybdenum nitrogen alloy, nickel platinum alloy, nitinol, nickel titanium alloy, nickel titanium aluminum alloy, niobium-titanium alloy, platinum iridium alloy, platinum palladium gold alloy, titanium aluminum vanadium alloy, titanium based aluminum iron alloy, titanium based aluminum molybdenum zirconium alloy, titanium based molybdenum niobium alloy, titanium based molybdenum zirconium iron alloy, titanium based niobium zirconium alloy, titanium based niobium zirconium tantalum alloy, titanium molybdenum alloy, titanium niobium alloy, titanium platinum alloy, and titanium-based molybdenum zirconium tin alloy.

It is understood that throughout this disclosure when CRMC paste and pure platinum paste are referred to, those pastes include solvents and binders that will be baked out during sintering. Suitable binders are selected from the group consisting of ethyl cellulose, acrylic resin, polyvinyl alcohol, polyvinyl butyral and a poly(alkylene carbonate) having the general formula R—O—C(═O)—O with R=C1 to C5. Poly(ethylene carbonate) or poly(propylene carbonate) are preferred poly(alkylene carbonates). Suitable solvents are selected from the group consisting of terpineol, butyl carbitol, cyclohexanone, n-octyl alcohol, ethylene glycol, glycerol, water, and mixtures thereof.

In that respect, an important aspect of a miniature electrochemical cell according to the present invention centers around three enabling areas: (1) packing the ceramic substrate via holes 18, 22 and 26 with a high platinum solids loading in the CRMC paste and in the platinum paste, (2) compression of the ceramic substrate against the CRMC paste and in turn the CRMC paste against the platinum paste during binder bake-out and sintering, and (3) a controlled cool down rate in combination with interfacial bonding sufficient to tolerate coefficient of thermal expansion (CTE) mismatch. That is because metal/ceramic compatibility is an important factor in manufacturing hermetic structures. The difference in CTEs of the metal and ceramic is recognized as a major parameter in predicting compatibility. The thermal expansion of a metal is generally considerably greater than that of a ceramic material. For example, at a bake-out temperature of 500° C., the CTE of alumina is $7.8\times10^{-6}$/K and of platinum is $9.6\times10^{-6}$/K. Historically, a CTE difference within the range of $0.5\times10^{-6}$/K to $1.0\times10^{-6}$/K between the mating metal and ceramic material is adequate to sustain hermetic bonding between these materials. However, it is believed that a difference beyond that range at the bake-out temperature for the alumina/platinum pair may produce sufficient tensile stresses at the interface during cooling to cause spontaneous bonding failure. Hence, given the significant difference in CTEs, even at a relatively low temperature of 500° C., achieving a hermetic seal between the platinum metal and alumina ceramic material would not be expected if the difference in CTE between the sintered alumina and the platinum metal exceeds the range of $0.5\times10^{-6}$/K to $1.0\times10^{-6}$/K.

In addition, a highly irregular surface at the material interface between the alumina substrate and the platinum metal particles within the via hole provides a mechanical contribution to adherence and robustness of the hermetic seal. A surface roughness produced by drill bits, sandblasting, grit blasting or chemical etching of the ceramic substrate can increase the surface area and, in so doing, provide for a stronger mechanical attachment along the mutually conformal interface. Examples of sandblasting and grit blasting media include sand, sodium bicarbonate, walnut shells, alumina particles, and other equivalent media.

According to the present invention, to achieve sustainable hermeticity, the following is required. Because the CTE of platinum is sufficiently higher than that of alumina, it is not theoretically possible for alumina to provide compressive forces on a platinum body in a via hole. Hence, to overcome the CTE differences between these two materials, the CRMC paste preferably has a ratio of alumina to platinum that ranges, by weight %, from about 10:90 to about 90:10, more preferably from about 50:50, still further preferably 70:30 to 30:70.

The via holes 18, 22 and 26 through the alumina substrates 12, 14 must be packed with the CRMC paste to occupy at least about 90% of the available space. In a preferred embodiment, the CRMC paste is packed to occupy about 95% of the via hole space. In a more preferred embodiment, the CRMC paste is packed to occupy about 99% of the via hole. The CRMC paste is a smooth, soft mass having a pliable consistency and comprising alumina particles, pure platinum particles, a binder material and a solvent.

Further, the platinum contacting the CRMC mixture in the via that was previously drilled through the CRMC material is a platinum paste occupying at least about 90% of the available space in the drilled CRMC via hole. In a preferred embodiment, the platinum paste is packed within the CRMC via to occupy about 95% of the space. In a more preferred embodiment, the platinum paste is packed to occupy about 99% of the CRMC via. In the case of the substantially pure platinum, a "paste" is defined as a smooth, soft mass having a pliable consistency and comprising pure platinum particles, a binder material and a solvent.

Moreover, shrinkage of the alumina substrate against the CRMC mixture and of the alumina in the CRMC mixture against the platinum paste must be no greater than about 20% of that of the platinum in the via hole. In a preferred embodiment, shrinkage is about 14%. In a more preferred embodiment, shrinkage is about 16%.

Importantly, the CRMC mixture 20A closely matches the thermal coefficient of expansion of the alumina substrate 12. This results in a very good hermetic seal between the CRMC mixture 20A and the alumina substrate 12 and between the CRMC mixture 20A and the cylinder of substantially pure platinum 20B. Further, the CRMC mixture 20A which surrounds the pure platinum cylinder 20B forms a buffer during sintering and subsequent thermal shock so that there is a gradation of the differential and thermal coefficient of expansion. The thickness of the CRMC paste 20A can be adjusted along with the diameter of the pure platinum cylinder 20B so that during co-firing no stress cracks are induced in the ceramic substrate 12.

The electrode assembly of the cell 10 comprises an anode current collector 32 seated against the lower surface 12C of the upper substrate 12. An anode active material 34 contacts the opposite side of the current collector 32. Similarly, a cathode current collector 36 is seated against the upper surface 14B of the lower substrate 14. A cathode active material 38 is contacted to the opposite side of the cathode current collector 36. An alumina spacer 40 serving as a separator resides between the anode and the cathode active materials 34, 38. Preferably, the separator 40 is in direct contact with the anode active material 34 and the cathode active material 38 opposite their respective current collectors 32, 26. That way, the separator 40 prevents direct physical contact between the anode active material 34 and the cathode active material 38 while allowing for ionic transport and conductivity therebetween.

An optional weld band 42 surrounds the electrode assembly comprising the stacked anode current collector 32, anode active material 34, separator 40, cathode active material 38 and cathode current collector 36. An upper edge 42A of the weld band 42 contacts the lower surface 12C of the first substrate 12 while a lower edge 42B thereof contacts the upper surface 14B of the second substrate 14.

An annular air space 44 resides between the weld band 42 and the peripheral edges of the anode and cathode current collectors 32, 36, anode active material 34, cathode active material 38 and the intermediate separator 40. Opposite the annular air space, the weld band 42 contacts the depending and upstanding portions 12D and 14D of the respective first and second substrate 12, 14.

An upper annular ring 46 of CRMC paste surrounds the depending portion 12D of the first substrate 12 while a lower annular ring 48 of CRMC paste surrounds the upstanding portion 14D of the second ceramic substrate 14. The upper and lower annular rings 46 and 48 are spaced inwardly from the major sidewalls 12A and 14A of the respective ceramic substrates 12, 14. This provides a space for an upper annular ring 50 of a substantially pure platinum paste that surrounds the upper annular ring 46 of CRMC paste. Similarly, a lower annular ring 52 of a substantially pure platinum paste surrounds the lower annular ring 48 of CRMC paste. The pairs of the depending and upstanding ceramic portions 12D and 14D, the upper and lower CRMC rings 46 and 48, and the upper and lower substantially pure platinum rings 50 and 52 meet each other at respective interfaces that are aligned with each other.

In that manner, the miniature electrochemical cell 10 is constructed by first positioning the CRMC rings 46 and 48 followed by the substantially pure platinum rings 50 and 52 into position with the respective ceramic substrates 12 and 14, all in a green state. The first and third via holes 18 and 26 are provided with their respective CRMC and platinum structures in a green state. Similarly, the second via hole 22 of the second ceramic substrate 14 is provided with its CRMC and platinum structure in a green state.

After the ceramic substrate subassemblies 12, 14 including their filled via holes 18, 22 and 26, respective CRMC rings 46, 48 and respective substantially pure platinum rings 50 and 52 are assembled, the substrate subassemblies are subjected to a controlled binder bake-out, sintering and cool down processing profile. The binder bake-out portion is performed at a temperature of from about 400° C. to about 700° C. for a minimum of about 4 hours. A preferred binder bake-out is at a temperature of from about 550° C. to about 650° C. A more preferred binder bake-out is at a temperature of from about 500° C. to about 600° C.

The sintering profile is preferably performed at a temperature ranging from about 1,400° C. to about 1,900° C. for up to about 6 hours. A preferred sintering profile is at a temperature ranging from about 1,500° C. to about 1,800° C. A more preferred sintering temperature ranges from about 1,600° C. to about 1,700° C.

The cool down profile occurs either by turning off the heating chamber and allowing the chamber to equalize to room temperature or, preferably by setting the cool down portion at a rate of up to about 5° C./min from the hold temperature cooled down to about 1,000° C. At about 1,000° C., the chamber is allowed to naturally equalize to room temperature. A more preferred cool down profile is at a rate of about 1° C./min from the hold temperature to about 1,000° C. followed by allowing the heating chamber to naturally equalize to room temperature. In so doing, the desired outcome of achieving a robust hermetic seal is achieved between the mating materials of the alumina and platinum. It is noted that these materials have a CTE mismatch beyond the limits heretofore recognized as adequate for sustained bonding.

During processing, compression is imparted by the alumina substrate around the CRMC paste and in turn the CRMC paste against the platinum paste within the via due to the shrinkage of the alumina being greater than that of the CRMC mixture and the shrinkage of the CRMC mixture being greater than that of the substantially pure platinum. Furthermore, the platinum is sufficiently malleable at this phase to be favorably deformed by the compressive forces being applied by the alumina in the substrates 12, 14 and in the CRMC paste. The combination of the platinum solids loading, the platinum packing in the via hole and the shrinkage of the alumina being greater than that of platinum results in the platinum taking the shape of the mating CRMC surface and in turn the CRMC surface taking the shape of the alumina substrate surface.

In other words, the compressive forces that result from the greater shrinkage of the alumina substrate than that of the CRMC mixture and in turn the shrinkage of the CRMC mixture being greater than that of the platinum within the via holes 18, 22 and 26 limit expansion of the platinum and force the platinum to deform such that it forms a hermetic seal. Thus, an interface between the alumina and CRMC mixture and between the CRMC mixture and the platinum material that conform to the respective interface surfaces and result in a nearly exact mirror image of the interfacing surfaces is formed, thereby creating a hermetic bond therebetween. This mutually conformal interface is critical.

Under certain processing conditions CRMC bodies may form a thin glass layer or even an alumina layer over the via ends. It may be necessary therefore to remove this formed layer with an additional manufacturing step, such as acid etch, lapping or mechanical abrasion.

After the substrate subassemblies 12, 14 have been subjected to the binder bake-out, sintering and cool down processing, the optional weld band 42 is positioned into one of the upper and lower ceramic substrates 12, 14. The electrode assembly comprising the previously described anode current collector 32, anode active material 34, separator 40, cathode active material 38 and cathode current collector 36 is nested inside the weld band 42. The other of the upper and lower ceramic substrate 12, 14 is then moved into position so that their respective annular faces 12G and 14G contact each other. A laser (not shown) is then used to direct a laser beam at the annular interface between the pure platinum rings 50 and 52. This serves to melt the platinum material in the rings and also possibly melt the platinum in the CRMC rings 46 and 48 to thereby hermetically seal the ceramic subassemblies 12 and 14 together. If desired, the laser beam can also be directed at the annular interface between the upper platinum ring 50 and the upper ceramic substrate 12 and at the annular interface between the lower platinum ring 52 and the lower ceramic substrate 14.

The electrode assembly housed inside the hermetically seal ceramic subassemblies 12 and 14 is then activated with an electrolyte filled through the fill opening 30 in the third via hole 26 in the upper substrate 12. Finally, a hermetic electrochemical cell 10 is provided by sealing the fill opening 30 with a laser beam in a similar manner as previously described with respect to sealing the ceramic subassemblies 12 and 14 together with a laser beam directed at the annular interface between the platinum rings 50, 52.

Figure 2:
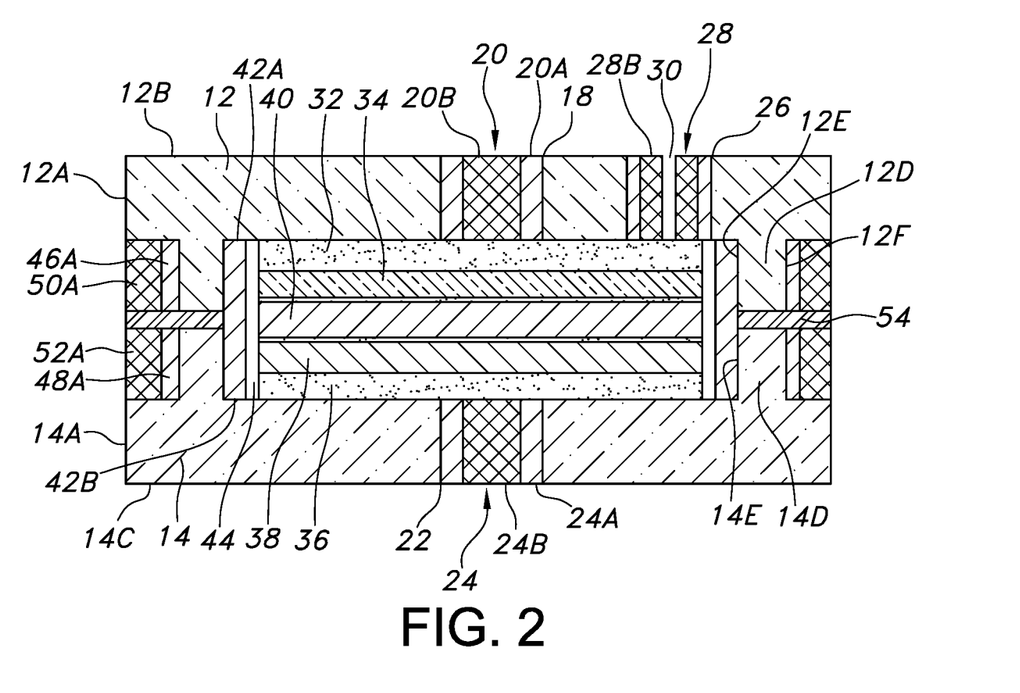
FIG. 2 is a cross-sectional view of another embodiment of a miniature electrochemical cell 10A according to the present invention.

The electrochemical cell 10A illustrated in FIG. 2 is similar to the cell 10 shown in FIG. 1 except that the depending portion 12D of the ceramic substrate 12 and the upstanding portion 14D of the lower ceramic substrate do not abut or contact each other. Instead, they are spaced apart from each other. Similarly, the respective CRMC rings 46A and 48A, and the respective platinum rings 50A and 52A are spaced apart from each other. An annular disc 54 of a precious metal, for example a disc selected from gold, platinum and palladium resides in this gap. A laser beam is directed at the precious metal disc 54 to fuse the disc to the platinum rings 50A, 52A and to the CRMC rings 46A, 48A to thereby seal the upper and lower ceramic subassemblies 12 and 14 together.

An activating electrolyte is filled through the fill hole 30 into contact with the electrode assembly housed therein and the fill hole is sealed with a laser beam as previously described.

Figure 3:
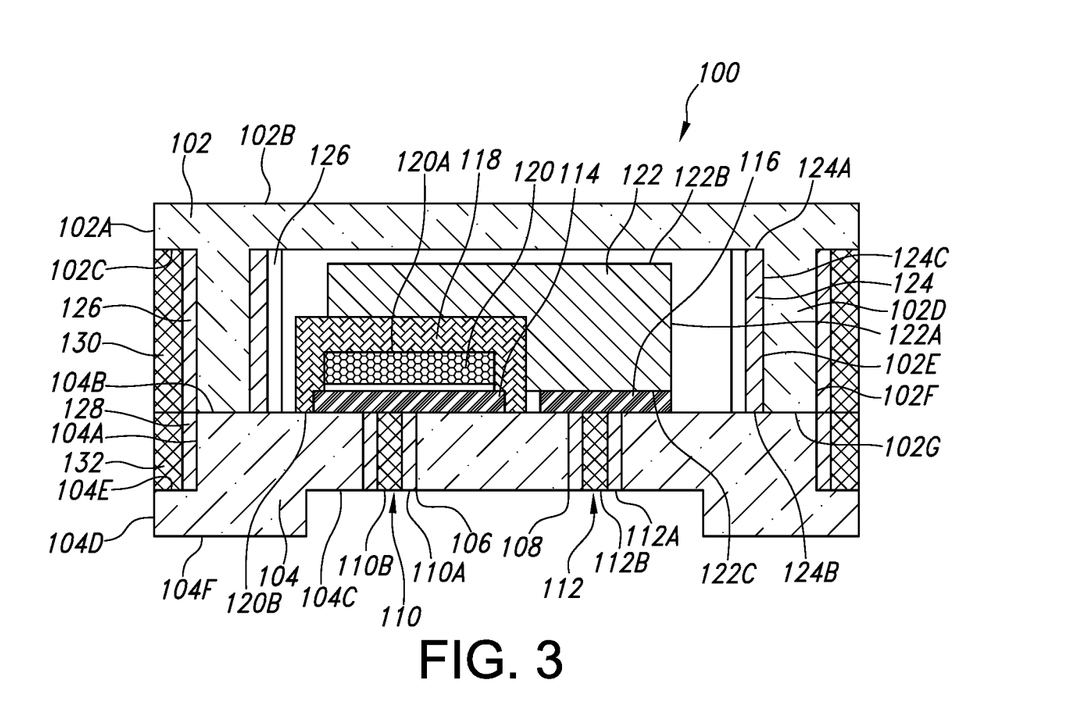
FIG. 3 is a cross-sectional view of another embodiment of a miniature electrochemical cell 100 according to the present invention.

FIG. 3 illustrates another embodiment of a miniature electrochemical cell 100 according to the present invention. The cell 100 comprises a first monolithic substrate or plate 102 of a ceramic material, for example, of alumina that is spaced from a second monolithic substrate or plate 104 of a ceramic material, for example, of alumina. In a similar manner as the various substrates described for the electrochemical cells 10 and 10A illustrated in FIGS. 1 and 2, the first and second substrates 102, 104 may be fabricated from a pressed ceramic slurry in tape form, for example 92%-99% alumina ($Al_2O_3$). The substrate material may be flexible or rigid.

The first ceramic substrate 102 has a major sidewall 102A extending to an upper surface 102B and a lower surface 102C. The upper and lower surfaces 102B, 102C are substantially co-planar. The major sidewall 102A is not limited to any particular shape; it can have a curved annular shape or comprise front and back sidewall portions meeting right and left sidewall portions. In fact, a myriad of other shapes is contemplated for the major sidewall 102A of the first ceramic substrate 102, the shape being limited only by the form factor for the particular application or device that the cell 100 is intended to power.

A depending annular portion 102D extends downwardly from the lower surface 102C of the ceramic substrate 102.

The annular portion 102D comprises an inner annular surface 102E spaced from an outer annular surface 102F. Both annular surfaces 102E and 102F meet an annular face 102G. As shown, the annular portion 102D is spaced inwardly from the major sidewall 102A.

The second ceramic substrate 104 has a first sidewall 104A extending to an upper surface 104B and a lower surface 104C. The upper and lower surfaces 104B, 104C are substantially co-planar. The second ceramic substrate 104 further has a second sidewall 104D extending to an upper surface 104E and a lower surface 104F. The upper and lower surfaces 104E, 104F are substantially co-planar. Moreover, the upper surface 104E meets the first sidewall 104A as a monolithic structure. Importantly, the second sidewall 104D is spaced outwardly from the first sidewall 104A to thereby form an annular ledge where the second upper surface 104E meets the first sidewall 104A. The second annular sidewall 104D is substantially aligned with the first sidewall 102A of the first substrate 102.

The second substrate 104 preferably comprises a monolithic alumina substrate that has a first via hole 106 and a second via hole 108, both extending from the upper surface 104B to the lower surface 104C thereof. The via holes 106 and 108 are provided with respective conductive pathways 110 and 112 that each extend to the spaced apart upper and lower second substrate surfaces 104B and 104C. The conductive pathway 108 residing in the via hole 106 comprises a CRMC paste 110A contacting the alumina substrate 104 and a substantially pure platinum paste 110B disposed inside a via hole drilled through the CRMC paste. Similarly, the conductive pathway 112 residing in the second via hole 108 comprises a CRMC paste 112A contacting the alumina substrate 104 and a substantially pure platinum paste 112B disposed inside a via hole drilled through the CRMC paste. This is in a similar manner as the previously described conductive pathways 20 and 24 illustrated in FIGS. 1 and 2 for electrochemical cells 10 and 10A.

The electrode assembly of the cell 100 comprises a cathode current collector 114 seated against the upper surface 104B of the lower substrate 104 aligned with the first via hole 106. An anode current collector 116 is seated against the upper surface 104B of the lower substrate aligned with the second via hole 108. In their aligned orientations, the cathode current collector 114 contacts the platinum 110B in via hole 106 and the anode current collector 116 contacts the platinum 112B in via hole 108.

A cathode active material 118 contacts the cathode current collector 114 opposite the platinum 110B in via hole 106. A separator 120 has an annular shape in plain view with a recess 120A that is sized and shaped to receive the cathode active material 118 supported on the cathode current collector 114. An outer annular edge 120B of the separator contacts or is otherwise supported on the upper surface 104B of the second substrate 104.

A shaped anode 122 contacts the anode current collector 116 opposite the platinum material 112B in the via hole 108. The anode active material 122 also contacts the separator 120. In that respect, the anode 122 has a curved sidewall 122A extending to an upper surface 122B. A shaped lower surface 122C opposite the upper surface 112B contacts the anode current collector 116 and separator 120 to thereby provide the anode with a backwards and sideways L-shape in cross-section.

An exemplary chemistry for the miniature electrochemical cell 100 shown in FIG. 3 has lithium as an exemplary anode active material, $LiCoO_2$ as a cathode active material and the separator is of LiPON ($Li_xPO_yN_z$, with x ranging from 3 to 4, y ranging from 3 to 4 and z ranging from 0.1 to 1). LiPON is a solid material that serves as both the separator and the electrolyte for the $Li/LiCoO_2$ couple.

An optional weld band 124 surrounds the side-by-side anode 122 and cathode 118 including their respective current collectors 116, 114 and the intermediate separator 118. In that respect, an upper edge 124A of weld band 124 contacts a lower surface 102C of the upper substrate 102 while a lower edge 124B of the band rests on the upper surface 104B of the lower substrate 104. An outer surface 124C of the weld band is spaced inwardly from the peripheral sidewalls 102D of the first substrate 102. An air gap 126 resides between the weld band 124 and the electrode assembly.

An upper annular ring 126 of CRMC paste surrounds the depending portion 102D of the first substrate 102 while a lower annular ring 128 of CRMC paste surrounds the sidewall 104A of the second ceramic substrate 104. The upper and lower annular rings 126 and 128 are spaced inwardly from the sidewalls 102A and 104D of the respective ceramic substrates 102, 104. This provides a space for an upper annular ring 130 of a substantially pure platinum paste that surrounds the upper annular ring 126 of CRMC paste. Similarly, a lower annular ring 132 of a substantially pure platinum paste surrounds the lower annular ring 128 of CRMC paste. The pairs of the depending and upstanding ceramic portions 102D and 104A, the upper and lower CRMC rings 126 and 128, and the upper and lower substantially pure platinum rings 130 and 132 meet each other at respective interfaces that are aligned with each other.

In that manner, the miniature electrochemical cell 100 is constructed by first positioning the CRMC rings 126 and 128 followed by the substantially pure platinum rings 130 and 132 into position with the respective ceramic substrates 102 and 104, all in a green state. The first and second via holes 108 and 106 are provided with their respective CRMC and platinum structures in a green state.

After the ceramic substrate subassemblies 102, 104 including their filled via holes 106 and 108, respective CRMC rings 126, 128 and respective substantially pure platinum rings 130 and 132 are assembled, the substrate subassemblies are subjected to a controlled binder bake-out, sintering and cool down processing profile as previously described with respect to electrochemical cells 10 and 10A.

After binder bake-out, sintering and cool down processing, the optional weld band 124 is positioned in one of the upper and lower ceramic substrates 102, 104, preferably the lower substrate. The electrode assembly comprising the previously described anode current collector 116, anode active material 122, separator 120, cathode active material 118 and cathode current collector 114 is nested inside the weld band 124. The other of the upper and lower ceramic substrate 102, 104, preferably the upper substrate, is then moved into position so that their respective annular surfaces 102G and 104B contact each other. A laser (not shown) is then used to direct a laser beam at the annular interface between the pure platinum rings 130 and 132. This serves to melt the platinum material in the rings and also possibly melt the platinum in the CRMC rings 126 and 128 to thereby hermetically seal the ceramic subassemblies 102 and 104 together. If desired, the laser beam can also be directed at the annular interface between the upper platinum ring 130 and the upper ceramic substrate 102 and at the annular interface between the lower platinum ring 132 and the lower ceramic substrate 104.

In a broad sense, the miniature electrochemical cells 10, 10A and 100 can each be of a primary or a secondary chemistry. If a primary chemistry, the anode can also comprise metals capable of alloying with lithium at potentials below 1.0 V vs. lithium such as Sn, Si, Al, B, Si—B, and composites of those metals with inactive metals to reduce volume expansion. The form of the anode may vary, but preferably it is of a thin sheet or foil that is pressed, evaporation, or rolled on the metallic anode current collector.

The cathode of a primary cell is of electrically conductive material, preferably a solid material. The solid cathode may comprise a metal element, a metal oxide, a mixed metal oxide, and a metal sulfide, and combinations thereof. A preferred cathode active material is selected from the group consisting of silver vanadium oxide, copper silver vanadium oxide, manganese dioxide, cobalt nickel, nickel oxide, copper oxide, copper sulfide, iron sulfide, iron disulfide, titanium disulfide, copper vanadium oxide, carbon monofluoride, and mixtures thereof.

Before fabrication into an electrode for incorporation into an electrochemical cell, the cathode active material is mixed with a binder material such as a powdered fluoro-polymer, more preferably powdered polytetrafluoroethylene or powdered polyvinylidene fluoride (PVDF) present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture for the electrochemical cells 10 and 10A, but not for cell 100 thus includes a powdered fluoro-polymer binder present at about 3 weight percent, a conductive diluent present at about 3 weight percent, and about 94 weight percent of the cathode active material.

The primary electrochemical cells 10 and 10A include a nonaqueous, ionically conductive electrolyte having an inorganic, ionically conductive salt dissolved in a nonaqueous solvent and, more preferably, a lithium salt dissolved in a mixture of a low viscosity solvent and a high permittivity solvent. The salt serves as the vehicle for migration of the anode ions to intercalate or react with the cathode active material and suitable salts include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, LiSCN, $LiO_3SCF_3$, $LiC_6F_5SO_3$, $LiO_2CCF_3$, $LiSO_6F$, $LiB(C_6H_5)_4$, $LiCF_3SO_3$ and mixtures thereof.

Suitable low viscosity solvents include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy,2-methoxyethane (EME), ethyl methyl carbonate, methyl propyl carbonate, ethyl propyl carbonate, diethyl carbonate, dipropyl carbonate, and mixtures thereof. High permittivity solvents include cyclic carbonates, cyclic esters and cyclic amides such as propylene carbonate (PC), ethylene carbonate (EC), butylene carbonate, acetonitrile, dimethyl sulfoxide, dimethyl, formamide, dimethyl acetamide, γ-valerolactone, γ-butyrolactone (GBL), N-methyl-pyrrolidinone (NMP), and mixtures thereof. The preferred electrolyte for a lithium primary cell is 0.8M to 1.5M $LiAsF_6$ or $LiPF_6$ dissolved in a 50:50 mixture, by volume, of PC as the preferred high permittivity solvent and DME as the preferred low viscosity solvent.

By way of example, in an illustrative electrochemical cell, the active material of the cathode is silver vanadium oxide as described in U.S. Pat. Nos. 4,310,609 and 4,391,729 to Liang et al., or copper silver vanadium oxide as described in U.S. Pat. Nos. 5,472,810 and 5,516,340 to Takeuchi et al., all assigned to the assignee of the present invention, the disclosures of which are hereby incorporated by reference.

In the exemplary secondary electrochemical cell 100, in addition to lithium, the anode 122 can comprise a material capable of intercalating and de-intercalating an alkali metal, and preferably lithium. A carbonaceous anode comprising any of the various forms of carbon (e.g., coke, graphite, acetylene black, carbon black, glassy carbon, etc.), which are capable of reversibly retaining the lithium species, is preferred. Graphite is particularly preferred due to its relatively high lithium-retention capacity. Regardless of the form of the carbon, fibers of the carbonaceous material are particularly advantageous because they have excellent mechanical properties that permit them to be fabricated into rigid electrodes capable of withstanding degradation during repeated charge/discharge cycling.

The cathode 118 of the exemplary secondary electrochemical cell 100 preferably comprises a lithiated material that is stable in air and readily handled. Examples of such air-stable lithiated cathode materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$, $LiCo_{1-x}Ni_xO_2$, $LiFePO_4$, $LiNi_xMn_yCo_{1-x-y}O_2$, and $LiNi_xCo_yAl_{1-x-y}O_2$.

For electrochemical cells 10 and 10A, the lithiated active material is preferably mixed with a conductive additive selected from acetylene black, carbon black, graphite, and powdered metals of nickel, aluminum, titanium and stainless steel. The cathode further comprises a fluoro-resin binder, preferably in a powder form, such as PTFE, PVDF, ETFE, polyamides and polyimides, and mixtures thereof.

The respective current collectors are selected from stainless steel, titanium, tantalum, platinum, gold, aluminum, cobalt nickel alloys, highly alloyed ferritic stainless steel containing molybdenum and chromium, and nickel-, chromium- and molybdenum-containing alloys.

Suitable secondary electrochemical systems are comprised of nonaqueous electrolytes of an inorganic salt dissolved in a nonaqueous solvent and more preferably an alkali metal salt dissolved in a quaternary mixture of organic carbonate solvents comprising dialkyl (non-cyclic) carbonates selected from dimethyl carbonate (DMC), diethyl carbonate (DEC), dipropyl carbonate (DPC), ethyl methyl carbonate (EMC), methyl propyl carbonate (MPC), and ethyl propyl carbonate (EPC), and mixtures thereof, and at least one cyclic carbonate selected from propylene carbonate (PC), ethylene carbonate (EC), butylene carbonate (BC), and vinylene carbonate (VC), and mixtures thereof. Organic carbonates are generally used in the electrolyte solvent system for such battery chemistries because they exhibit high oxidative stability toward cathode materials and good kinetic stability toward anode materials.

Whether of a primary or a secondary chemistry, the cells 10 and 10A are filled with the appropriate electrolyte described hereinabove and hermetically sealed such as by close-welding the fill openings 30 using a laser beam.

Now, it is therefore apparent that the present invention relates to various embodiments for miniature electrochemical cells having a total volume of less than 0.5 cc. Moreover, while embodiments of the present invention have been described in detail, such is for the purpose of illustration, not limitation.

What is claimed is:

1. An electrochemical cell, comprising:
a) a casing, comprising:
  i) a first ceramic substrate comprising opposed first substrate inner and outer surfaces; and
  ii) a second ceramic substrate comprising opposed second substrate inner and outer surfaces; and
b) an electrode assembly housed inside the casing, the electrode assembly comprising:
  i) an anode active material contacting an anode current collector;
  ii) a cathode active material contacting a cathode current collector; and
  iii) a solid electrolyte disposed between the anode and cathode active materials; and
c) a first conductive pathway extending through the first ceramic substrate and comprising first conductive pathway inner and outer surfaces located at or adjacent to the respective first ceramic substrate inner and outer surfaces; and
d) a second conductive pathway extending through the first ceramic substrate and comprising second conductive pathway inner and outer surfaces located at or adjacent to the respective first ceramic substrate inner and outer surfaces,
e) wherein the first conductive pathway inner surface is in an electrically conductive relationship with one of the anode and cathode current collectors, and wherein the second conductive pathway inner surface is in an electrically conductive relationship with the other of the anode and cathode current collectors, and
f) wherein the respective first and second conductive pathway outer surfaces are configured for electrical connection to a load.

2. The electrochemical cell of claim 1, wherein the first conductive pathway comprises a first via hole extending through the first ceramic substrate, a first ceramic/platinum mixture disposed in the first via hole in a sealed relationship with the first ceramic substrate, and a first substantially pure platinum body disposed in a sealed relationship extending through the first ceramic/platinum mixture opposite the first ceramic substrate.

3. The electrochemical cell of claim 1, wherein the second conductive pathway comprises a second via hole extending through the first ceramic substrate, a second ceramic/platinum mixture disposed in the second via hole in a sealed relationship with the first ceramic substrate, and a second substantially pure platinum body disposed in a sealed relationship extending through the first ceramic/platinum mixture opposite the first ceramic substrate.

4. The electrochemical cell of claim 1, wherein:
a) a first substrate depending wall extends downwardly and annularly from the first substrate inner surface, the first substrate depending wall comprising a first depending wall outer annular face spaced from the first substrate inner surface; and
b) a second substrate upstanding wall extends upwardly and annularly from the second substrate inner surface, the second substrate upstanding wall comprising a second upstanding wall outer annular face spaced from the second substrate inner surface.

5. The electrochemical cell of claim 4, wherein the opposed first substrate inner and outer surfaces extend to a first substrate outer annular edge, the first substrate depending wall being spaced inwardly from the first substrate outer annular edge, and wherein the opposed second substrate inner and outer surfaces extend to a second substrate outer annular edge, the second substrate upstanding wall being spaced inwardly from the second substrate outer annular edge, the electrochemical cell further comprising:
a) a first ring of a first sintered ceramic/platinum mixture contacting the first substrate inner surface and an outer surface of the first substrate depending wall, the first ring having a first ring outer annular face aligned with the first depending wall outer annular face, and wherein a second ring of a second sintered substantially pure platinum contacts an outer surface of the first ring, the second ring having a second ring outer annular face aligned with the first ring outer annular face and the depending wall outer annular face; and
b) a third ring of a third sintered ceramic/platinum mixture contacting the second substrate inner surface and an outer surface of the second substrate upstanding wall, the third ring having a third ring outer annular face aligned with the second upstanding wall outer annular face, and wherein a fourth ring of a fourth sintered substantially pure platinum contacts an outer surface of the third ring, the fourth ring having a fourth ring outer annular face aligned with the third ring outer annular face and the upstanding wall outer annular face,
c) wherein at least the second and fourth ring outer annular faces are welded together.

6. The electrochemical cell of claim 5, wherein the first and third outer annular faces are welded together.

7. The electrochemical cell of claim 5, wherein the first and third rings of the respective first and third sintered ceramic/platinum mixtures are further characterized as having been welded to the respective first and second ceramic substrates spaced from the respective first depending wall outer annular face and the second upstanding wall outer annular face, and wherein the second and fourth rings of the substantially pure platinum are characterized as having been welded to the respective first and second ceramic substrates spaced from the respective first depending wall outer annular face and the second upstanding wall outer annular face.

8. The electrochemical cell of claim 1, wherein the first and second sintered ceramic/platinum mixtures individually comprise, by weight %, from 70:30 ceramic:platinum to 30:70 ceramic:platinum.

9. The electrochemical cell of claim 1, wherein the solid electrolyte is $Li_xPO_yN_z$, with x ranging from 3 to 4, y ranging from 3 to 4 and z ranging from 0.1 to 1.

10. The electrochemical cell of claim 1, wherein the first and second ceramic substrates are individually selected from alumina and 3% YSZ.

11. The electrochemical cell of claim 1, wherein the electrode assembly is of either a primary or a secondary chemistry.

12. An electrochemical cell, comprising:
a) a casing, comprising:
  i) a first ceramic substrate comprising opposed first substrate inner and outer surfaces, wherein a first substrate annular wall extends outwardly from the first substrate inner surface; and
  ii) a second ceramic substrate comprising opposed second substrate inner and outer surfaces, wherein a second substrate annular wall extends outwardly from the second substrate inner surface; and
b) an electrode assembly housed inside the casing, the electrode assembly comprising:
  i) an anode active material contacting an anode current collector;
  ii) a cathode active material contacting a cathode current collector; and iii) a solid electrolyte disposed between the anode and cathode active materials; and c) a first conductive pathway extending through the first ceramic substrate and comprising first conductive pathway inner and outer surfaces located at or adjacent to the respective first ceramic substrate inner and outer surfaces; and d) a second conductive pathway extending through the first ceramic substrate and comprising second conductive pathway inner and outer surfaces located at or adjacent to the respective first ceramic substrate inner and outer surfaces, e) wherein the first conductive pathway inner surface is in an electrically conductive relationship with one of the anode and cathode current collectors, and wherein the second conductive pathway inner surface is in an electrically conductive relationship with the other of the anode and cathode current collectors, and f) wherein the respective first and second conductive pathway outer surfaces are configured for electrical connection to a load.

13. The electrochemical cell of claim 12, wherein:
a) the first conductive pathway comprises a first via hole extending through the first ceramic substrate, a first sintered ceramic/platinum mixture disposed in the first via hole in a sealed relationship with the first ceramic substrate, and a first sintered substantially pure platinum body disposed in a sealed relationship extending through the first sintered ceramic/platinum mixture opposite the first ceramic substrate; and
b) the second conductive pathway comprises a second via hole extending through the first ceramic substrate.

14. The electrochemical cell of claim 12, wherein the second conductive pathway comprises a second via hole extending through the first ceramic substrate, a second sintered ceramic/platinum mixture disposed in the second via hole in a sealed relationship with the first ceramic substrate, and a second sintered substantially pure platinum body disposed in a sealed relationship extending through the second sintered ceramic/platinum mixture opposite the first ceramic substrate.

15. The electrochemical cell of claim 12, wherein a weld ring resides between the electrode assembly and at least one of the first and second substrate annular walls.

16. The electrochemical cell of claim 12, wherein the solid electrolyte is $Li_xPO_yN_z$, with x ranging from 3 to 4, y ranging from 3 to 4 and z ranging from 0.1 to 1.

17. The electrochemical cell of claim 12, wherein the first and second sintered ceramic/platinum mixtures individually comprise, by weight %, from 70:30 ceramic:platinum to 30:70 ceramic:platinum.

18. The electrochemical cell of claim 12, wherein the first and second ceramic substrates are individually selected from alumina and 3% YSZ.

19. The electrochemical cell of claim 12, wherein the electrode assembly is of a secondary chemistry.

20. An electrochemical cell, comprising:
a) a casing, comprising:
i) a first ceramic substrate comprising opposed first substrate inner and outer surfaces, wherein a first substrate annular wall extends outwardly from the first substrate inner surface;
ii) a second ceramic substrate comprising opposed second substrate inner and outer surfaces; and
b) an electrode assembly housed inside the casing, the electrode assembly comprising:
i) a lithium anode contacting an anode current collector;
ii) a $LiCoO_2$ cathode contacting a cathode current collector, wherein the anode and cathode current collectors are individually selected from copper and titanium and have a thickness ranging from about 0.1 microns to about 50 micros; and
iii) a solid separator disposed between the anode and cathode active materials; and
c) a first conductive pathway extending through the first ceramic substrate and comprising first conductive pathway inner and outer surfaces located at or adjacent to the respective first substrate inner and outer surfaces; and
d) a second conductive pathway extending through the first ceramic substrate and comprising second conductive pathway inner and outer surfaces located at or adjacent to the respective first substrate inner and outer surfaces,
e) wherein the first conductive pathway inner surface is in an electrically conductive relationship with one of the anode and cathode current collectors, and wherein the second conductive pathway inner surface is in an electrically conductive relationship with the other of the anode and cathode current collectors, and
f) wherein the respective first and second conductive pathway outer surfaces are configured for electrical connection to a load.

* * * * *